Sept. 25, 1962     E. VALENTE     3,055,286
AUTOMATIC COFFEE MAKING MACHINES
Filed Oct. 11, 1960     3 Sheets-Sheet 1

Inventor
Ernesto Valente
By: K.A. Mayr
Attorney

Sept. 25, 1962 E. VALENTE 3,055,286
AUTOMATIC COFFEE MAKING MACHINES
Filed Oct. 11, 1960 3 Sheets-Sheet 3

INVENTOR.
ERNESTO VALENTE
BY K.A. Mayr
ATTORNEY 3,055,286
AUTOMATIC COFFEE MAKING MACHINES
Ernesto Valente, Via Ventura 5, Milan, Italy
Filed Oct. 11, 1960, Ser. No. 61,994
Claims priority, application Italy Oct. 14, 1959
5 Claims. (Cl. 99—289)

This invention concerns coffee making machines.

Conventional automatic coffee making machines are expensive and cumbersome and not satisfactory.

A semi-automatic apparatus has been proposed to prepare, for example, coffee, wherein means are provided to support a permeable package containing powdered coffee, said means allowing liquid to enter an underlying container after passing through said package. There is also an element above the package and vertically reciprocable to a limited extent, said element comprising a space for the liquid and an outlet, and a valve which normally closes said outlet, but which may be opened by means of hydraulic pressure inside of said space. Means are provided to seal said liquid between said element and means supporting the package when said element is lowered. Manually operated means are provided to press the liquid from the space toward the outlet. A device of this type is disclosed in Patent No. 2,529,395.

It is an object of the present invention to provide an automatic coffee making machine which is easy to assemble, is inexpensive, and safe in operation.

An object of the invention resides in the provision of an automatic coffee making machine which ensures preparation of hot coffee, the infusion apparatus being at least in part surrounded by hot water and the outlet for the infusion water being integral with the hot water boiler.

A further object of the invention is the provision of a fully automatic coffee making machine which is controlled by hydraulic means receiving pressure water as operating fluid from the same source from which the boiler supplying the infusion water is supplied. The machine includes an intermittently advancing conveyor having special receptacles which are moved from a charging station where the receptacles are filled with ground coffee to an infusion station and therefrom to a station where the exhausted coffee grounds are dropped out of the receptacles. The empty receptacles are thereupon returned to the charging station. The conveyor is advanced by the forward stroke of a hydraulic differential piston having a small surface whereon the pressure water acts continuously and a large surface at the opposite side of the piston whereto pressure water is supplied by manipulation of a valve whenever preparation of a predetermined quantity of coffee drink is desired.

The differential piston opens a pressure water supply valve upon termination of its forward stroke. The thus supplied pressure water causes actuation of a piston for water-tightly pressing a receptacle containing fresh ground coffee in upward direction against an outlet for the infusion water and causes opening of a valve for supplying hot infusion water to said outlet and into the receptacle. The water, after passage through the ground coffee, flows as ready coffee drink through a tubular extension of the last mentioned piston to the outside. Opening movement of the infusion water supply valve causes closing of the manually operated pressure water supply valve and simultaneous opening of a pressure water relief valve connected to the space in the cylinder of the differential piston on the large surface side of the differential piston for restricted flow of pressure water from the cylinder whereby the differential piston is slowly returned to its initial position by the action of the pressure water on the small surface side of the piston. Return movement of the differential piston causes opening of a second relief valve for relieving pressure water which has previously been supplied for actuating the infusion water control valve and the piston pressing the ground coffee receptacles to the infusion water outlet. The infusion water control valve is thereby closed and the manually operated pressure water supply valve is made ready to be opened when preparation of another coffee drink is desired.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 2 is a section along line II—II of FIG. 1.

Figure 1:
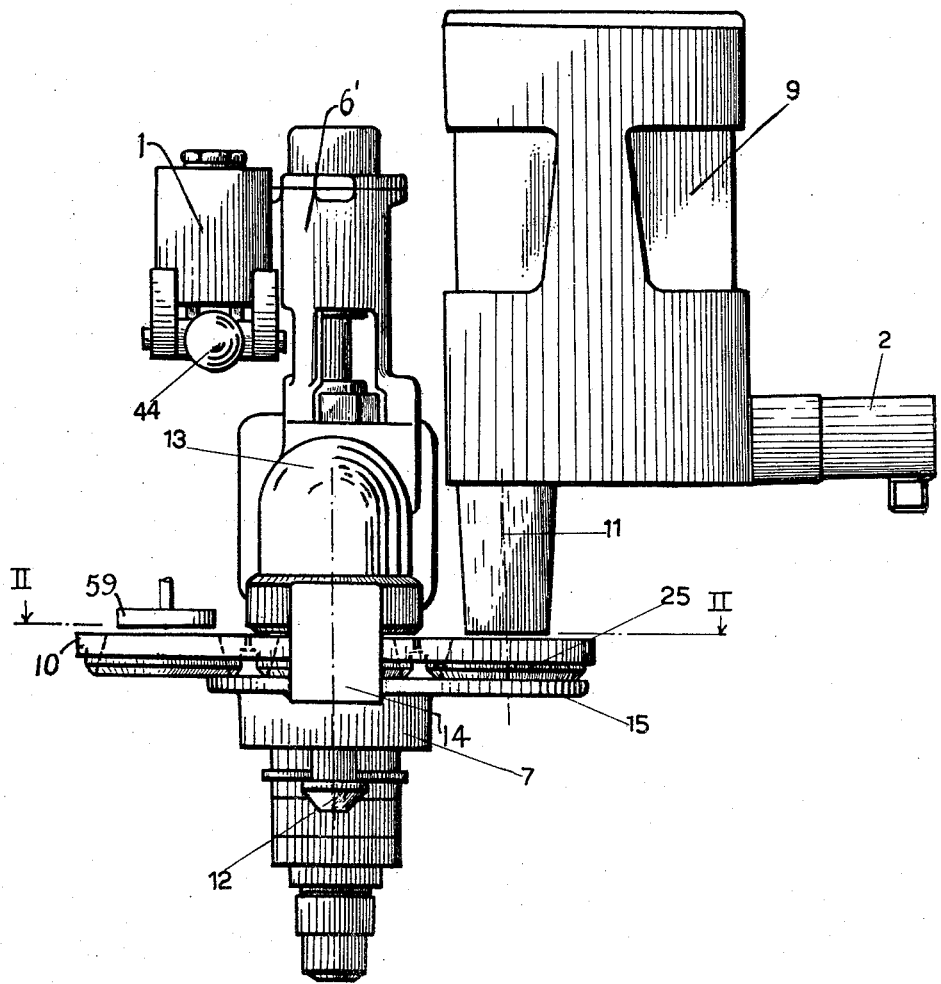
FIG. 1 is a diagrammatic side view of a single head coffee making machine according to the invention.

The illustrated machine comprises a frame with a disc 10 fitted therein for rotation around a vertical axis. Said disc forms a conveyor and is provided with four like circular apertures, each aperture accommodating an annular element whose outside is step-shaped and which has a sleeve portion 25 axially movable in the respective aperture. The inside of each annular element is flared towards its lower end. The centers of the apertures are equally spaced from the center of the disc 10 and are placed at 90° angles, occupying positions 21, 22, 23, 24 in the position of the disc 10 shown in FIG. 2. When the vertical center line of one of the annular elements coincides with the vertical center line 11 of the outlet of a dosing and coffee charging device 9, the vertical center line of the circumferentially following annular element coincides with the vertical center line 12 of the outlet of an infusion water supply device. Both outlets are arranged above the disc 10. The infusion water outlet is formed in an enlarged portion of the wall of a boiler 29 and has a portion 14 supporting a horizontal plane arcuate plate 15 placed below and parallel to the disc 10 and adjacent to the annular elements when moving from the charging station 11 to the infusion station 12. Integral and concentric with said disc 10 is a ratchet wheel 16, cooperating with a pawl 17 supported by a rotatable ring 18 which is coaxial with said disc, the ring 18 being pivotally connected by means of a link 19 to the end 33 of a differential piston 40, shown in FIG.3. The piston 40 is movable in a hydraulic cylinder 3 whose axis is parallel to the disc 10 and substantially tangential to the wheel 16. The dosing device 9 is provided with a hydraulic cylinder 2 containing a piston 47 (FIG. 3) whose axis is parallel to the rotatable disc 10 and which controls the opening of an outlet for discharging individual doses of ground coffee. The piston 47 operates against a spring 46. The dosing or charging device, per se, is not illustrated because it does not form part of the present invention.

Figure 3:
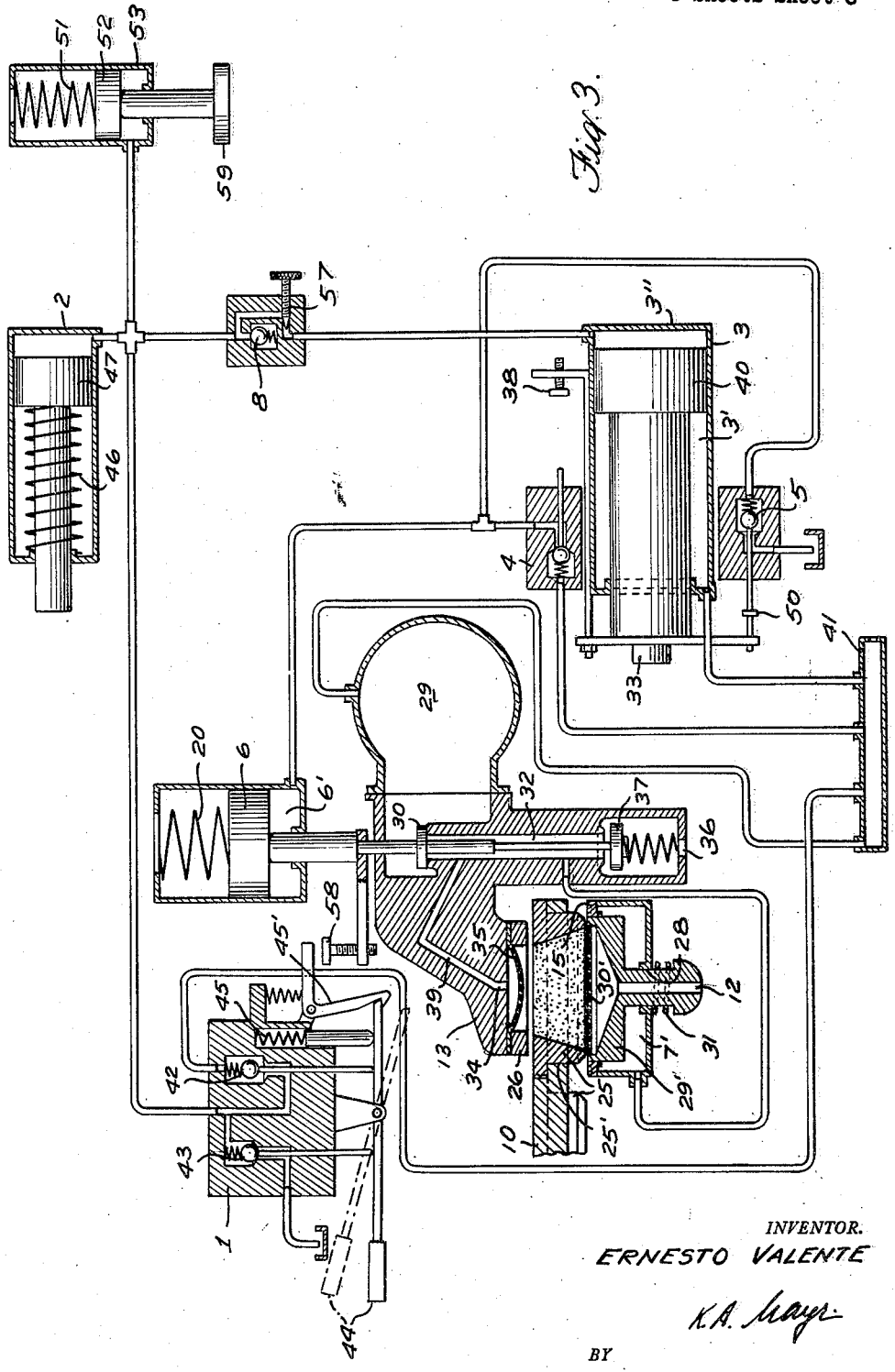
FIG. 3 is a diagrammatic illustration of the hydraulic operating apparatus of the machine.

Each of the annular elements, when opposite the plate 15, forms a container for powdered coffee. The plate 15 is provided with a vertical, hollow cylindrical extension 7 coaxial with the axis 12 of the outlet of the infusion water supply device and surrounding a cylindrical space 7' (FIG. 3). A hollow piston 29' is slidable in the space 7' and has a cavity at its upper end which is closed by a perforated plate 30' which is adapted to make contact with an annular element when in the position 22. The lower part 31 of the piston 29' is tubular and has a smaller diameter than the upper end and slides in an aperture 28 in the bottom wall of the extension 7. The space 7' is connected to the water chamber of a boiler 29 by a channel 32 provided with a valve 30, which is closed by the action of a spring 20 and which may be opened by hydraulically lifting a piston 6 in a cylinder 6' against the action of the spring 20. The outlet 13 of the hot water supply device comprises a channel 39 connected to the channel 32 and terminating at 34 in a horizontal plane surface at the lower end of the outlet 13. This surface is opposite the piston 29' and covered by a strainer 35. The disc 10 moves between said horizontal surface and the part 15. The channel 32 has an outlet 36 controlled by a valve 37 which is rigidly connected to the valve 30. The valves 30 and 37 operate in opposite manner, i.e., one valve closes upon opening of the second valve and conversely. The flow resistance of the channel 39 is greater than that of the channel 32.

Figure 2:
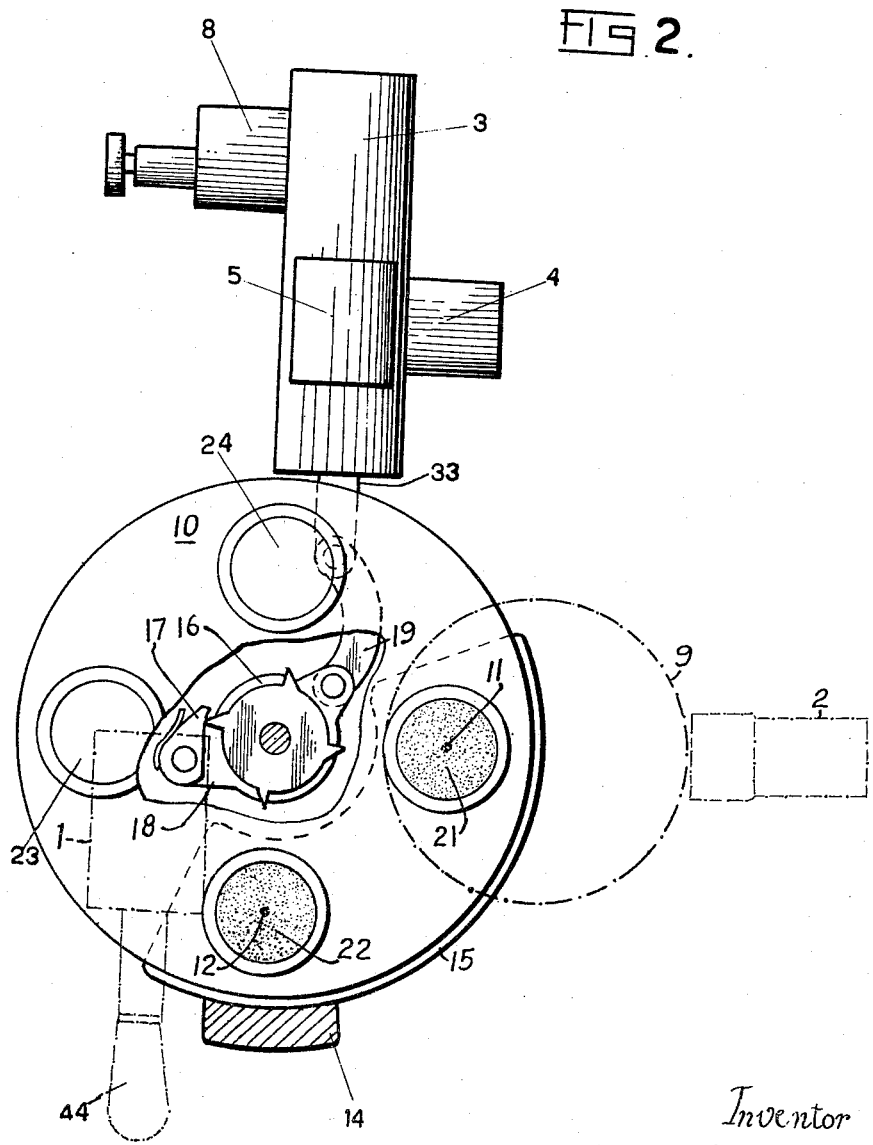
FIG. 2 is a plan view of the machine, from which the coffee grinding and dosing device and the boiler have been removed.

The disc 10 is intermittently rotated in clockwise direction, in FIG. 2, by the hydraulically actuated piston 40 in the cylinder 3. The piston 40 controls a valve 4 by means of a bracket with an adjustment screw 38 and a relief valve 5, valve 4 controlling flow of water under pressure to the hydraulic cylinder 6' containing the piston 6 which is connected to and actuates valve 30 controlling pressure water supply to the space 7' for actuating the piston 29'. The relief valve 5 serves for controlling flow of water out of the cylinder 6'.

Numeral 1 designates a control unit for the coffee making machine. The unit 1 comprises an inlet valve 42 which is normally closed and an outlet or relief valve 43 which is normally open. A lever 44 operating against the action of a spring 45 engages a catch 45'. The lever 44 affords simultaneous opening of the valve 42 and closing of the valve 43. A suitable source of fresh water 41 under a pressure of, for example, 7 atmospheres directly supplies the boiler 29 as well as the chamber 3' of the cylinder 3 and, through valve 4, feeds pressure water to the cylinder 6'. The pressure water can be relieved from the cylinder 6' through the valve 5. The source 41 supplies pressure water also to the unit 1 which, through the valve 42, connects the source 41: (a) with the cylinder 2 at the side of the piston 47 opposite the side actuated upon by the spring 46; (b) with a cylinder 53 at the side of a piston 52 opposite the side of the piston on which spring 51 actuates. The cylinder 2 is combined with and the piston 47 actuates the dosing device 9. The vertical axis of piston 52 which is integral with a plunger 59, coincides with the vertical extending through the center of the aperture of the disc 10 which aperture is in the position 23; (c) through a check valve 8, with the space 3" of the cylinder 3 at the large diameter side of the piston 40. The valve 8 comprises a by-pass channel controlled by a needle valve 57.

The catch 45' is connected to the piston 6 by means of a linkage 58 for disengaging the catch 45' from the lever 44 upon upward movement of the piston 6.

Operation: When lever 44 is lowered against the action of the spring 45 the outlet valve 43 is closed and water at 7 atmospheres flows through valve 42, now open, into the hydraulic cylinder 2, moving the piston 47 against the action of spring 46, and into the cylinder 53, moving the piston 52 against the spring 51 and withdrawing the plunger 59 from the annular element which is in position 23 for unlocking the disc 10.

The piston 47 releases by conventional means, not shown, a dose of ground coffee into the annular element which is in the position 21. A device of this type is disclosed in Patent No. 2,392,452.

At the same time water is supplied through check valve 8 to the chamber 3" of cylinder 3 and moves the piston 40 to the left in FIG. 3. This water is at its maximum pressure after the pistons 47 and 52 have reached their end positions.

When the piston 40 has completed its stroke to the left it has turned the disc 10 so that the annular element which has been filled with ground coffee at the station 21 is now in the position 22. In the left end position of the piston 40 an adjustment screw 33 in a bracket connected to the piston 40 abuts against a rod actuating the valve 4 and opens the latter. The relief valve 5 was allowed to close at the beginning of the movement of the piston 40 to the left. Pressure water admitted through valve 4 to the cylinder 6' moves the piston 6 against the action of spring 20 whereby the valve 30 is opened and the valve 37 controlling the outlet 36 is closed. Upward movement of the piston 6 also causes, through the linkage 58, withdrawal of the catch 45' from the lever 44, allowing the latter to be returned to its initial position by the spring 45 for closing valve 42 and stopping supply of pressure water to the cylinders 2 and 53 and to the check valve 8.

Since the valve 30 is open and the valve 37 is closed hot water flows from the boiler 29 into the spac 7' and lifts the piston 29', pressing the filter 30' against the sleeve portion of the annular element which is now in the position 22 and sealing the element against the plane surface at the outlet of the hot water supply device, a gasket 26 being connected to said surface and interposed between the annular element in position 22 and said surface.

The pressure in the conduit 32 now rises to 7 atmospheres and hot water passes through conduit 39 and strainer 35 and permeates the powdered coffee in the receptacle therebelow. In the meantime the piston 40 is slowly moved to the right by the water pressure in space 3' of cylinder 3 and water is pressed from the chamber 3" of the cylinder 3 through the needle valve 57. At the beginning of the movement of the piston 40 to the right the bracket with the adjustment screw 38 permits the valve 4 to close whereby supply of pressure water to the cylinder 6' is stopped. When the piston 40 has completed its stroke to the right an abutment 50 rigidly connected to the left end of the piston opens the valve 5, permitting discharge of pressure water from the cylinder 6'. The spring 20 now presses the piston 6 downward whereby the valve 30 is closed and no more hot water is supplied to the ground coffee. The valve 37 is simultaneously opened and water still in the coffee container and in the channels 39 and 32 leaves through the outlet 36 and the exhausted coffee grounds are dried. The piston 29' with the filter 30' moves downward since the space 7' is also connected to the outlet 36 and the pressure in the space 7' is reduced to atmospheric pressure. This downward movement is assisted by a spring 31'.

For preparing the next supply of coffee, the lever 44 is lowered and plunger 59 is immediately lifted out of the seat element in position 23, unlocking the disc 10 and permitting clockwise rotation. The annular element filled with exhausted coffee grounds moves thereby to position 23 where there is no plate 15 so that the exhausted coffee cake can drop down. Should it stick to the annular element it will be pushed out by the plunger 59 upon subsequent downward movement thereof under the action of spring 51 upon closing of the valve 42 and opening of the valve 43.

I claim:

1. An automatic coffee making machine comprising a charging station, an infusion station, a coffee grounds discharge station, a conveyor including a plurality of receptacles for receiving ground coffee and adapted to move the receptacles consecutively from said charging station to said infusion station and therefrom to said coffee grounds discharge station, charging means at said charging station for charging said receptacles with ground coffee, hot water infusion means at said infusion station for passing hot water through the ground coffee in said receptacles and preparing coffee drinks, a mechanism operatively connected to said conveyor for intermittently advancing said conveyor to consecutively move one at a time of said receptacles from said charging station to said infusion station and thereupon to said discharge station, said mechanism including a cylinder, a differential piston movable therein and having a relatively small surface on one side and a relatively large surface at the opposite side, a source of pressure water permanently directly connected to the space in said cylinder opposite said small surface, a first conduit connecting said source to the space in said cylinder opposite said large surface of said piston, a control valve in said first conduit, a control member connected to said valve for actuating said valve, means for urging said control member into valve closing position, catch means connected to said control member for holding said control member in valve opening position against the action of said urging means to admit pressure water to said cylinder for moving said piston from a rest position to advance said conveyor, a check valve in said first conduit between said control valve and said cylinder for permitting flow of pressure water to said cylinder and stopping flow of pressure water through said first conduit in the opposite direction, said hot water infusion means including hydraulic regulating means for regulating the hot water supply to the ground coffee in the receptacles, a second conduit connecting said source of pressure water to said regulating means, a regulating valve in said second conduit and operatively connected to said piston for opening said regulating valve and actuating said regulating means to admit infusion water to the receptacle at the infusion station upon completion of the stroke of said piston effected by the pressure water admitted to said cylinder at the large side of said piston, a relief valve connected to said first conduit between said control valve and said check valve, said relief valve being operatively connected to said control member to be opened upon closing of said control valve and conversely, said regulating means being operativey connected to said catch means for releasing the latter from said control member to permit closing of said control valve and opening of said relief valve, a restricted by-pass conduit by-passing said check valve and affording restricted flow of pressure water from the space in said cylinder opposite said large surface to said relief valve and permitting said piston to slowly return to the rest position thereof, and a pressure water relief valve connected to said second conduit and being operatively connected to said piston for opening said last mentioned relief valve upon return of said piston to the rest position thereof.

2. An automatic coffee making machine as defined in claim 1 including actuating means connected to said piston and placed outside of said cylinder and operatively connected to said regulating valve and to said pressure water relief valve in said second conduit, said hydraulic regulating means including a cylinder and a piston movable therein, said second conduit being connected to said last mentioned cylinder, and said hot water infusion means including an infusion water control valve connected to said last mentioned piston to be operated thereby for controlling the supply of infusion water to said receptacles.

3. An automatic coffee making machine as defined in claim 1 wherein said conveyor includes a horizontal plate, at least three circular apertures in said plate, an annular member axially slidably inserted in each of said apertures, a stationary plate placed below and parallel to said horizontal plate, said annular members being adjacent to said stationary plate and forming said receptacles whose bottom is formed by said stationary plate when said annular members are in the charging station and on the way to said infusion station, a hollow cylinder extending downward from said stationary plate at said infusion station and having a closed lower end, a piston in said last mentioned cylinder, said infusion means having a hot water outlet portion having a horizontal plane surface above and vertically spaced from said last mentioned cylinder, said annular members, when in said infusion station, being between said last mentioned cylinder and said surface, said infusion means including an infusion water control valve connected to said regulating means for operation thereby, said infusion water control valve simultaneously effecting flow of hot pressure water to said last mentioned cylinder below said last mentioned piston for pressing said last mentioned piston against said annular member and the latter against said plane surface and effecting flow of hot pressure water through said outlet into the ground coffee in the annular member which is in the infusion station, said last mentioned piston having a cavity at the end facing said hot water outlet for receiving the coffee drink and having a tubular extension extending through the closed lower end of said last mentioned cylinder for conducting the coffee drink to the outside.

4. An automatic coffee making machine according to claim 3 including first conduit means connecting said infusion water control valve and said outlet, and second conduit means connecting said infusion water control valve and said last mentioned cylinder, said first conduit means being restricted relative to said second conduit means for primarily conducting pressure water to said last mentioned piston and secondarily supplying pressure water to the ground coffee in the annular member pressed by said last mentioned piston against said surface.

5. An automatic coffee making machine according to claim 3 including an outlet valve connected to said infusion water control valve for closing said outlet valve upon opening of said infusion water control valve and conversely for relieving infusion water from said first conduit means and from said last mentioned cylinder for moving said last mentioned piston from and releasing said annular member upon termination of the hot water infusion.

References Cited in the file of this patent
UNITED STATES PATENTS

| 1,467,778 | Paola | Sept. 11, 1923 |
| 2,014,325 | Grilli | Sept. 10, 1935 |
| 2,910,928 | Rota | Nov. 3, 1959 |

FOREIGN PATENTS

| 1,184,141 | France | Feb. 2, 1959 |